J. B. BLAKE
Gas Stove.
No. 12,434.
2 Sheets—Sheet 1.
Patented Feb. 27, 1855.
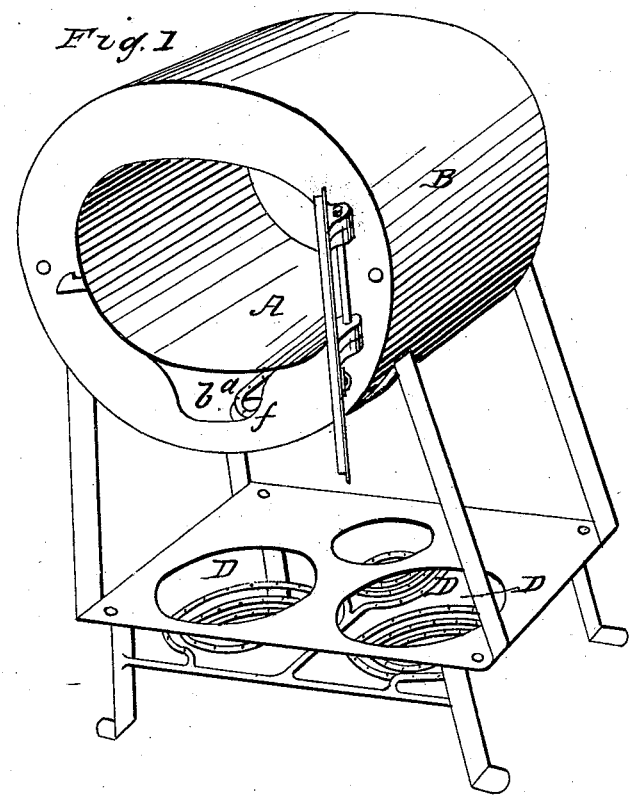
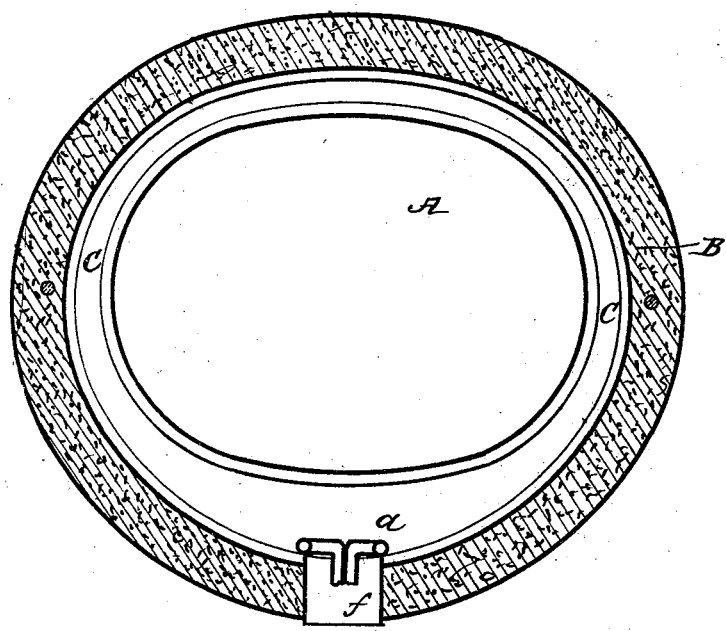

J. B. BLAKE.
Gas Stove.
No. 12,434.
2 Sheets—Sheet 2.
Patented Feb. 27, 1855.
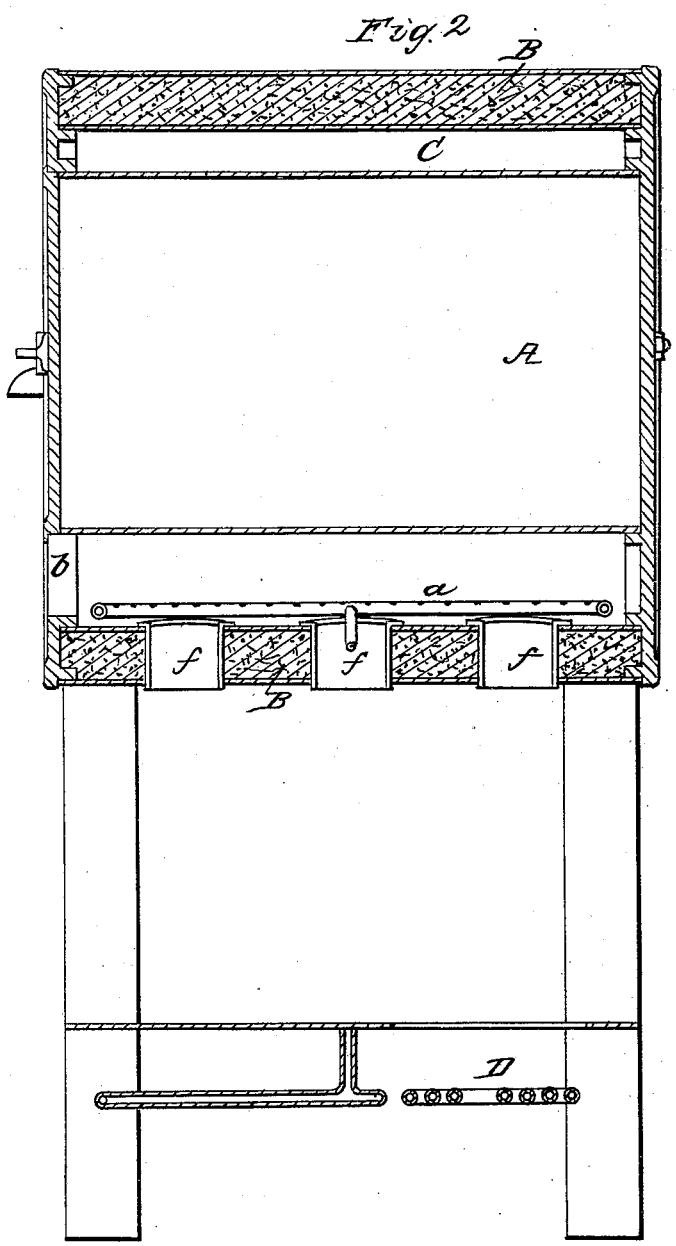

UNITED STATES PATENT OFFICE.

JAMES B. BLAKE, OF WORCESTER, MASSACHUSETTS.

GAS COOKING-STOVE.

Specification of Letters Patent No. 12,434, dated February 27, 1855.

*To all whom it may concern:*

Be it known that I, JAMES B. BLAKE, of Worcester, in the county of Worcester and State of Massachusetts, have invented certain new and useful Improvements in Gas Cooking-Stoves, of which the following is a full, clear, and exact description, reference being had to the annexed drawings, making part of this specification, in which—

Figure 1 is a perspective view of my stove; Fig. 2, a longitudinal section and Fig. 3 a transverse section through the same.

In most of the stoves heretofore contrived for the purpose of cooking with gas the latter has been allowed to ignite within the interior of the oven, and the meats were thus exposed to contact with the smoke and other products of combustion; in such cases it has been found necessary to maintain a constant circulation of air within the oven for the double purpose of effecting the combustion of the gas, and of carrying off the products of the same, and attempts were made to remedy these defects by burning the gas in a separate chamber beneath, and to causing the heated air and smoke to pass round, and in contact with, the outside of the oven. In all such cases however the products of combustion and heated air have been allowed to pass immediately off from the top of the oven, and a great amount of heat is thus lost by the rapid current of air induced. To remove all these defects, is the object of my present invention, by means of which an oven may be heated quickly and with great economy of gas at the same time that the meats are not exposed to contact with the smoke of the burning gas and other products of combustion, and my invention consists in burning the gas in a separate chamber, and in immediate contact with the bottom of the oven the heated products being retained within a chamber entirely surrounding the oven until sufficiently cooled to settle to the bottom of the chamber, whence they are permitted to escape through openings prepared for the purpose, the oven being thus constantly surrounded by a volume of air and gases at a very high temperature, which are allowed to escape from the holes at the bottom, only as they are sufficiently cooled to descend or as they are forced down by the accumulation of heated gases above. I am thus enabled to heat my oven in a very small space of time, and with an exceedingly small amount of gas.

To enable others skilled in the art to make and use my invention I will proceed to describe the method which I have adopted of carrying it out.

In the accompanying drawings A is the oven. B the shell or double case which surrounds the oven, and which is packed with charcoal or other non-conducting substance to prevent the loss of heat. Beneath the bottom of the oven A are the burners $a$, the air for the support of the combustion being admitted at the opening $b$. The gas burns immediately in contact with the bottom of the oven the heated gases and smoke passing up into the space C between the oven and the exterior case B; here they are retained until partially cooled, when they descend and pass off through the openings $f$.

D are the burners for boiling, broiling, &c., which do not vary essentially from those at present in use for the purpose.

What I claim as my invention and desire to secure by Letters Patent is—

The within described method of heating the oven of a gas cooking stove, the oven being surrounded by a flue or chamber having an opening in one end for the admission of air for the combustion of the gas, which is burned immediately beneath the oven, and openings in the bottom for the escape of the products of combustion, the latter being retained in contact with the oven, until sufficiently cooled to descend and pass off in the manner set forth.

JAMES B. BLAKE.

Witnesses:
JNO. A. DANA,
THEODORE F. BARTLETT.